US010388484B2

(12) United States Patent
Wang et al.

(10) Patent No.: US 10,388,484 B2
(45) Date of Patent: Aug. 20, 2019

(54) CARBURIZED $LA_2O_3$ AND $LU_2O_3$ CO-DOPED MO FILAMENT CATHODE

(71) Applicant: BEIJING UNIVERSITY OF TECHNOLOGY, Beijing (CN)

(72) Inventors: Jinshu Wang, Beijing (CN); Liran Dong, Beijing (CN); Jie Zhang, Beijing (CN); Mingchuang Tian, Beijing (CN); Jingchao Liu, Beijing (CN); Xiaoyang Chen, Beijing (CN); Xiao Han, Beijing (CN); Liyang Xiao, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 15/757,343

(22) PCT Filed: Dec. 30, 2016

(86) PCT No.: PCT/CN2016/113406
§ 371 (c)(1),
(2) Date: Mar. 2, 2018

(87) PCT Pub. No.: WO2018/036068
PCT Pub. Date: Mar. 1, 2018

(65) Prior Publication Data

US 2018/0254164 A1 Sep. 6, 2018

(30) Foreign Application Priority Data

Aug. 26, 2016 (CN) .......................... 2016 1 0743795

(51) Int. Cl.
*H01S 4/00* (2006.01)
*H01J 23/05* (2006.01)
(Continued)

(52) U.S. Cl.
CPC ................ *H01J 23/05* (2013.01); *B22F 3/24* (2013.01); *B22F 5/12* (2013.01); *C22C 32/0031* (2013.01);
(Continued)

(58) Field of Classification Search
CPC .. H01J 23/05; H01J 9/042; H01J 23/04; H01J 9/04; C23C 8/80; C23C 8/578;
(Continued)

(56) References Cited

U.S. PATENT DOCUMENTS 6,255,764 B1 7/2001 Choi et al. ................ 313/346 R
6,281,626 B1 8/2001 Nakamura et al. ........... 313/491

FOREIGN PATENT DOCUMENTS

CN 1240235 A * 1/2000
CN 1240235 A 1/2000
(Continued)

OTHER PUBLICATIONS

RU2342732C1___Translated (Year: 2008).*
(Continued)

*Primary Examiner* — Thiem D Phan
(74) *Attorney, Agent, or Firm* — J.C. Patents

(57) ABSTRACT

A carburized $La_2O_3$ and $Lu_2O_3$ co-doped Mo filament cathode is made from lanthanum oxide ($La_2O_3$) and lutetium oxide ($Lu_2O_3$) doped molybdenum (Mo) powders, the lanthanum oxide ($La_2O_3$) and lutetium oxide ($Lu_2O_3$) doped molybdenum (Mo) powders contain $La_2O_3$, $Lu_2O_3$ and Mo with the total concentration of $La_2O_3$ and $Lu_2O_3$ being 2.0-5.0 wt. % and the rest being Mo.

15 Claims, 1 Drawing Sheet

(51) Int. Cl.

| | |
|---|---|
| ***H01J 9/04*** | (2006.01) |
| ***H01J 23/04*** | (2006.01) |
| ***B22F 3/24*** | (2006.01) |
| ***C23C 8/20*** | (2006.01) |
| ***C23C 8/80*** | (2006.01) |
| ***B22F 5/12*** | (2006.01) |
| ***C22C 32/00*** | (2006.01) |
| *H05B 6/66* | (2006.01) |

(52) U.S. Cl.

CPC .................. *C23C 8/20* (2013.01); *C23C 8/80* (2013.01); *H01J 9/04* (2013.01); *H01J 9/042* (2013.01); *H01J 23/04* (2013.01); *B22F 2003/241* (2013.01); *B22F 2301/20* (2013.01); *B22F 2302/25* (2013.01); *B22F 2998/10* (2013.01); *B22F 2999/00* (2013.01); *H05B 6/66* (2013.01); *H05B 2206/04* (2013.01); *Y10T 29/49002* (2015.01)

(58) Field of Classification Search

CPC ...... C23C 8/63; C23C 8/20; B22F 3/24; B01J 2523/3706; Y10T 29/4902; Y10T 29/49002; H05B 2206/04; H05B 6/66

USPC ............................. 29/592.1, 602.1, 825, 874

See application file for complete search history.

(56) References Cited

FOREIGN PATENT DOCUMENTS

| | | | | | |
|---|---|---|---|---|---|
| CN | 1360079 | A | | 7/2002 | |
| CN | 1389890 | A | | 1/2003 | |
| CN | 101447376 | A | | 6/2009 | |
| CN | 103849804 | A | | 6/2011 | |
| CN | 103700557 | A | * | 4/2014 | ................ H01J 1/14 |
| CN | 103700557 | A | | 4/2014 | |
| CN | 106206216 | A | | 12/2016 | |
| JP | H10-3846 | A | | 1/1998 | |
| RU | 2342732 | C1 | * | 12/2008 | |

OTHER PUBLICATIONS

CN1240235A___Translated (Year: 2000).*

CN103700557A___Translated (Year: 2014).*

International Search Report of corresponding International PCT Application No. PCT/CN2016/113406, dated May 25, 2017.

Yang, Fan et al., "$Y_2O_3$—$Lu_2O_3$ co-doped molybdenum secondary emission material" Applied Surface Science; vol. 270; (Apr. 2013); pp. 746-750.

The Chinese First Examination Report of corresponding Chinese application No. 201610743795.4, dated Jul. 24, 2017.

* cited by examiner

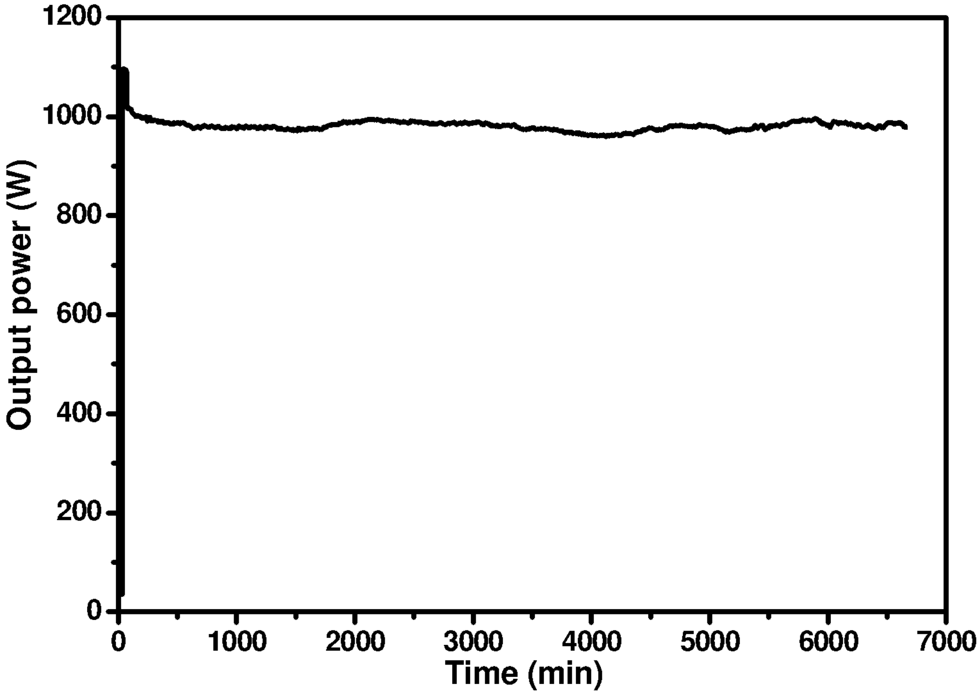
1200
1000
800
600
400
200
0
Output power (W)
0
1000
2000
3000
4000
5000
6000
7000
Time (min)

CARBURIZED $La_2O_3$ AND $LU_2O_3$ CO-DOPED MO FILAMENT CATHODE

CROSS-REFERENCE TO RELATED APPLICATION

This application is a national phase application of international application No. PCT/CN2016/113406 filed on Dec. 30, 2016, which in turn claims the priority benefits of Chinese application No. 201610743795.4, filed on Aug. 26, 2016. The contents of these prior applications are hereby incorporated by reference in their entirety.

TECHNICAL FIELD

The present disclosure relates to a carburized $La_2O_3$ and $Lu_2O_3$ co-doped Mo filament cathode and its fabrication method, which belongs to the technical field of rare earth-refractory metal cathodes.

BACKGROUND OF RELATED ART $ThO_2$—W thermionic cathodes, as the key part of the vacuum tubes, are widely used for many fields, such as microwave oven. However, $ThO_2$ is a radioactive substance and $ThO_2$—W thermionic cathode has poor ductility and low yield (~60%), which cause problems in the manufacturing and application of the cathodes. Therefore, it is essential to find out substantial materials.

$La_2O_3$ and $Lu_2O_3$ co-doped Mo filament cathode was fabricated by liquid-liquid (L-L) doping method. The mixed powders prepared by this method dispersed uniformly which can improve the emission homogeneity and emission stability. The cathode fabricated by L-L doping method can be operated with high temperature carbonization treatment and out-gassing treatment, these treatments are important to the emission stability of the cathode applied to the magnetrons. Study [$Y_2O_3$—$Lu_2O_3$ co-doped molybdenum secondary emission material, Yang, Fan; Wang, Jinshu; Liu, Wei; Liu, Xiang; Zhou, Meiling, APPLIED SURFACE SCIENCE, 270(746-750), 2013.] has shown that $Y_2O_3$—$Lu_2O_3$ doped Mo cermet cathodes possess higher secondary electron emission properties than $Y_2O_3$—Mo cathode. It means that adding $Lu_2O_3$ can improve the secondary electron emission properties of $Y_2O_3$—Mo cathode. $La_2O_3$—Mo cathode cannot be applied to magnetrons due to its poor emission stability, because there was no continuous supplement of electrons when this cathode was working. Since $Lu_2O_3$ can improve the secondary emission property of cathode, adding $Lu_2O_3$ into $La_2O_3$—Mo cathode may maintain the supplement of electrons when the $La_2O_3$—Mo cathode was working. Therefore, this patent added $Lu_2O_3$ and $La_2O_3$ into Mo powder to make $La_2O_3$ and $Lu_2O_3$ co-doped Mo filament cathode. This composition has not been reported by previous researches.

The present invention provides a method of carburization treatment of the $La_2O_3$ and $Lu_2O_3$ co-doped Mo filament cathode. The temperature of carburization of the present invention is much higher than the previous researchers, and the carburization time is short. The carburization degree of the present invention is high (about 10-50%). Therefore, there remains a further study of rare earth oxides doped Mo cathode used for magnetrons applied to microwave emitter equipment, especially for microwave oven.

SUMMARY

The present disclosure provides a carburized $La_2O_3$ and $Lu_2O_3$ co-doped Mo filament cathode used for magnetrons and methods for the fabrication. Active substances, $La_2O_3$ and $Lu_2O_3$, can improve the thermal emission property and emission stability of the cathode. A Mo cathode applied to magnetrons with $La_2O_3$ and $Lu_2O_3$ active substances and has good thermal emission property and emission stability has not been reported by previous researches.

One aspect of the invention provides a new kind of rare earth oxide doped molybdenum filament cathode material. In some embodiments, the rare earth oxides are lanthanum oxide ($La_2O_3$) and lutetium oxide ($Lu_2O_3$). The total concentration of rare earth oxides ranges from 2.0-5.0 wt. %, the rest is Mo. In some embodiments, the lanthanum oxide and lutetium oxide mixed in any proportions, especially in the weight ratios of (2-5):1, especially in the weight ratio of 4:1.

Another aspect of the present invention provides a method of manufacturing a rare earth oxide doped molybdenum filament cathode material. Comprising:

(1) mixing the solutions of $La(NO_3)_3$, $Lu(NO_3)_3$, $(NH_4)_6Mo_7O_{24}$ and citric acid with water-bath heating and persistently agitation. The weights of $La(NO_3)_3$, $Lu(NO_3)_3$, $(NH_4)_6Mo_7O_{24}$ and citric acid were determined by weight percent, and the weight of citric acid is 0.8 to 1.5 times of the weight of $(NH_4)_6Mo_7O_{24}.4H_2O$. After the mixed solutions losing most of the free-water to become a wet gel, and then drying the wet gel to obtain the xerogel. Calcining the xerogel thoroughly in air atmosphere at the temperature ranges from 500 to 680° C. to obtain the powders comprise $La_2O_3$, $Lu_2O_3$ and $MoO_3$;

(2) calcining the $La_2O_3$ and $Lu_2O_3$ co-doped $MoO_3$ powers in hydrogen by two steps to obtain the $La_2O_3$ and $Lu_2O_3$ co-doped Mo powers. The $La_2O_3$ and $Lu_2O_3$ co-doped Mo powers are prepared by two steps: calcining the calcined powders comprise $La_2O_3$, $Lu_2O_3$ and $MoO_3$ in hydrogen atmosphere at the temperature ranges from 500 to 680° C. to obtain $La_2O_3$, $Lu_2O_3$ doped $MoO_2$ powders thoroughly; calcining the $La_2O_3$, $Lu_2O_3$ doped $MoO_2$ powders further in hydrogen atmosphere at 800-980° C. to obtain $La_2O_3$ and $Lu_2O_3$ doped Mo powders completely;

(3) pressing and sintering the mixed powders to obtain the molybdenum rods. The molybdenum rods are sintered at the temperature ranges from 1800 to 2030° C.;

(4) operating further treatments of the $La_2O_3$ and $Lu_2O_3$ co-doped molybdenum rods to obtain the un-carburized $La_2O_3$ and $Lu_2O_3$ co-doped molybdenum filament cathode, comprising: rotary swaging treatment, drawing treatment, electrolytic cleaning treatment, straightening treatment, winding treatment, modeling treatment and cutting treatment;

(5) assembling of the un-carburized $La_2O_3$ and $Lu_2O_3$ co-doped molybdenum filament cathode and then carburizing the $La_2O_3$ and $Lu_2O_3$ co-doped Mo filament cathode. The temperature of carburization treatment of the present invention ranges from 1550 to 1900° C. for 60-150 s, and the carburization degree of the present invention is about 10-50%.

And then operating the out-gassing process with the magnetrons equipped with the carburized $La_2O_3$ and $Lu_2O_3$ co-doped Mo filament cathode. The temperature of the out-gassing treatment ranges from 1600 to 1900° C. for 20 to 60 mins. The out-gassing current of the cathode ranges from 10 to 12.5 A. And then operating the activation treatment of the carburized $La_2O_3$ and $Lu_2O_3$ co-doped Mo filament cathode, the temperature of the activation treatment of the $La_2O_3$ and $Lu_2O_3$ co-doped Mo filament cathode ranges from 1450 to 1650° C. for 10 to 30 mins. Finally assemble the electron tube to magnetron after activation treatment.

The working temperature of the carburized $La_2O_3$ and $Lu_2O_3$ co-doped Mo filament cathode working in the magnetrons ranges from 1200 to 1400° C.

The magnetrons equipped with the carburized $La_2O_3$ and $Lu_2O_3$ co-doped Mo filament cathode are applied to the microwave oven, especially when the total content of rare earth oxides was 3-4.5 wt. %.

The magnetrons equipped with the carburized $La_2O_3$ and $Lu_2O_3$ co-doped Mo filament cathode possesses high thermal emission property and good emission stability. When the total content of the rare earth oxides was 4 wt. %, the emission current of magnetron was ~640 mA, which is ~2 times of the $ThO_2$—W cathode (the emission current is ~330 mA under the same test condition). The lifetime of the carburized $La_2O_3$ and $Lu_2O_3$ co-doped Mo filament cathode is above 500 hours without attenuation, meeting the requirement of the microwave emitter equipments.

BRIEF DESCRIPTION OF THE DRAWINGS

The techniques of the present disclosure will now be described in detail with reference to the accompanying drawings.

FIG. 1 is a lifetime graph of output power of microwave oven versus time of a cathode as illustrated in example 5.

EXAMPLES

From the foregoing it will be appreciated that, although specific embodiments of the present disclosure have been described herein for purposes of illustration, various modifications may be made without deviating from the spirit and scope of the present disclosure. Accordingly, the present disclosure is not limited except as by the appended claims.

Example 1

Rare earth oxide was quantified in a weight fraction of 2 wt. % based on the rare earth oxide co-doped Mo powders, and the rest was Mo. Dissolving 42.53 g of $La(NO_3)_3.6H_2O$, 9.43 g of $Lu(NO_3)_3.6H_2O$, 1803.5 g of $(NH_4)_6Mo_7O_{24}.4H_2O$ and 1855 g of $C_6H_8O_7.H_2O$ in de-ionized water respectively and completely, adding the citric acid, $La(NO_3)_3$ and $Lu(NO_3)_3$ solution into the $(NH_4)_6Mo_7O_{24}$ solution slowly with persistently agitation; setting the mixed solution in a water-bath heating environment to obtain a wet gel; drying the wet gel to obtain the xerogel; calcining the xerogel at 500° C. to obtain $La_2O_3$ and $Lu_2O_3$ co-doped $MoO_3$ powers; and calcining the mixed trioxide powders in hydrogen atmosphere at 550° C. to obtain $La_2O_3$, $Lu_2O_3$ doped $MoO_2$ powders thoroughly; calcining the mixed oxide powders further in hydrogen at 980° C. to obtain $La_2O_3$ and $Lu_2O_3$ doped Mo powders completely; pressing the mixed powers into REO co-doped Mo billet at 150 MPa and remained for 15 mins; and sintering the REO co-doped Mo billets to obtain REO co-doped Mo rods at 1800° C. Rotary swaging the Mo rods for a few times to become the Mo sticks. Drawing the Mo sticks to decrease the diameter of the sticks to obtain the Mo filaments by multi drawing process. Cleaning the colloidal graphite on the surface of the Mo filament by electrolytic cleaning processes, and straightens the cleaned Mo filament. Winding Mo filament to a coil spring filament and annealing and modeling the Mo coil spring filament; cutting the molybdenum coil spring filament to small segments and each segment as a Mo filament cathode. First assembly of the filament cathodes and doing the carburization treatment of the REO co-doped Mo filament cathode at 1800° C. for 70 s and the carburization degree was 32.3%. Second assembly of the vacuum tubes and doing the out-gassing treatment of the magnetrons equipped with the carburized REO co-doped Mo filament cathode at 1800° C. for 30 minutes; and then third assembly of magnetrons and doing the activation treatment of the REO co-doped Mo filament cathode at 1600° C. for 30 minutes. Testing the direct current emission property of the electronic tube and the result was shown in Table 1. Then we tested the output power of the magnetron tube when the working temperature was 1250° C.

Example 2

Rare earth oxide was quantified in a weight fraction of 2.5 wt. % based on the rare earth oxide co-doped Mo powders, and the rest was Mo.

Dissolving 53.16 g of $La(NO_3)_3.6H_2O$, 11.79 g of $Lu(NO_3)_3.6H_2O$, 1794.2 g of $(NH_4)_6Mo_7O_{24}.4H_2O$ and 1859 g of $C_6H_8O_7.H_2O$ in de-ionized water respectively and completely, adding the citric acid, $La(NO_3)_3$ and $Lu(NO_3)_3$ solution into the $(NH_4)_6Mo_7O_{24}$ solution slowly with persistently agitation; setting the mixed solution in a water-bath heating environment to obtain a wet gel; drying the wet gel to obtain the xerogel; calcining the xerogel at 550° C. to obtain $La_2O_3$ and $Lu_2O_3$ co-doped $MoO_3$ powers; and calcining the mixed trioxide powders in hydrogen atmosphere at 550° C. to obtain $La_2O_3$, $Lu_2O_3$ doped $MoO_2$ powders thoroughly; calcining the mixed oxide powders further in hydrogen at 950° C. to obtain $La_2O_3$ and $Lu_2O_3$ doped Mo powders completely; pressing the mixed powers into REO co-doped Mo billet at 150 MPa and remained for 15 minutes; and sintering the REO co-doped Mo billets to obtain REO co-doped Mo rods at 1800° C. Rotary swaging the Mo rods for a few times to become the Mo sticks. Drawing the Mo sticks to decrease the diameter of the sticks to obtain the Mo filaments by multi drawing process. Cleaning the colloidal graphite on the surface of the Mo filament by electrolytic cleaning processes, and straightens the cleaned Mo filament. Winding Mo filament to a coil spring filament and annealing and modeling the Mo coil spring filament; cutting the molybdenum coil spring filament to small segments and each segment as a Mo filament cathode. First assembly of the filament cathodes and doing the carburization treatment of the REO co-doped Mo filament cathode at 1800° C. for 70 s and its carburization degree was 34.1%. Second assembly of the vacuum tubes and doing the out-gassing treatment of the magnetrons equipped with the carburized REO co-doped Mo filament cathode at 1800° C. for 30 mins; and then third assembly of magnetrons and doing the activation treatment of the REO co-doped Mo filament cathode at 1600° C. for 30 mins. Testing the direct current emission property of the electronic tube and the result was shown in Table 1. Then we tested the output power of the magnetron tube when the working temperature was 1250° C.

Example 3

Rare earth oxide was quantified in a weight fraction of 3 wt. % based on the rare earth oxide co-doped Mo powders, and the rest was Mo.

Dissolving 63.79 g of $La(NO_3)_3.6H_2O$, 14.15 g of $Lu(NO_3)_3.6H_2O$, 1785.0 g of $(NH_4)_6Mo_7O_{24}.4H_2O$ and 1862.9 g of $C_6H_8O_7.H_2O$ in de-ionized water respectively and completely, adding the citric acid, $La(NO_3)_3$ and $Lu(NO_3)_3$ solution into the $(NH_4)_6Mo_7O_{24}$ solution slowly with persistently agitation; setting the mixed solution in a water-bath heating environment to obtain a wet gel; drying the wet gel to obtain the xerogel; calcining the xerogel at 550° C. to obtain $La_2O_3$ and $Lu_2O_3$ co-doped $MoO_3$ powers; and calcining the mixed trioxide powders in hydrogen atmosphere at 550° C. to obtain $La_2O_3$, $Lu_2O_3$ doped $MoO_2$ powders thoroughly; calcining the mixed oxide powders further in hydrogen at 950° C. to obtain $La_2O_3$ and $Lu_2O_3$ doped Mo powders completely; pressing the mixed powers into REO co-doped Mo billet at 150 MPa and remained for 15 mins; and sintering the REO co-doped Mo billets to obtain REO co-doped Mo rods at 1850° C. Rotary swaging the Mo rods for a few times to become the Mo sticks. Drawing the Mo sticks to decrease the diameter of the sticks to obtain the Mo filaments by multi drawing process. Cleaning the colloidal graphite on the surface of the Mo filament by electrolytic cleaning processes, and straightens the cleaned Mo filament. Winding Mo filament to a coil spring filament and annealing and modeling the Mo coil spring filament; cutting the molybdenum coil spring filament to small segments and each segment as a Mo filament cathode. First assembly of the filament cathodes and doing the carburization treatment of the REO co-doped Mo filament cathode at 1700° C. for 75 s and its carburization degree was 28.2%. Second assembly of the vacuum tubes and doing the out-gassing treatment of the magnetrons equipped with the carburized REO co-doped Mo filament cathode at 1800° C. for 30 mins; and then the third assembly of magnetrons and doing the activation treatment of the REO co-doped Mo filament cathode at 1600° C. for 30 mins. Testing the direct current emission property of the electronic tube and the result was shown in Table 1. Then we tested the output power of the magnetron tube when the working temperature was 1250° C.

Example 4

Rare earth oxide was quantified in a weight fraction of 3.5 wt. % based on the rare earth oxide co-doped Mo powders, and the rest was Mo.

Dissolving 74.43 g of $La(NO_3)_3.6H_2O$, 16.50 g of $Lu(NO_3)_3.6H_2O$, 1775.8 g of $(NH_4)_6Mo_7O_{24}.4H_2O$ and 1866.7 g of $C_6H_8O_7.H_2O$ in de-ionized water respectively and completely, adding the citric acid, $La(NO_3)_3$ and $Lu(NO_3)_3$ solution into the $(NH_4)_6Mo_7O_{24}$ solution slowly with persistently agitation; setting the mixed solution in a water-bath heating environment to obtain a wet gel; drying the wet gel to obtain the xerogel; calcining the xerogel at 600° C. to obtain $La_2O_3$ and $Lu_2O_3$ co-doped $MoO_3$ powers; and calcining the mixed trioxide powders in hydrogen atmosphere at 600° C. to obtain $La_2O_3$, $Lu_2O_3$ doped $MoO_2$ powders thoroughly; calcining the mixed oxide powders further in hydrogen at 920° C. to obtain $La_2O_3$ and $Lu_2O_3$ doped Mo powders completely; pressing the mixed powers into REO co-doped Mo billet at 150 MPa and remained for 15 minutes; and sintering the REO co-doped Mo billets to obtain REO co-doped Mo rods at 1850° C. Rotary swaging the Mo rods for a few times to become the Mo sticks. Drawing the Mo sticks to decrease the diameter of the sticks to obtain the Mo filaments by multi drawing process. Cleaning the colloidal graphite on the surface of the Mo filament by electrolytic cleaning processes and straightens the cleaned Mo filament. Winding Mo filament to a coil spring filament and annealing and modeling the Mo coil spring filament; cutting the molybdenum coil spring filament to small segments and each segment as a Mo filament cathode. First assembly of the filament cathodes and doing the carburization treatment of the REO co-doped Mo filament cathode at 1700° C. for 75 s and its carburization degree was 29.3%. Second assembly of the vacuum tubes and doing the out-gassing treatment of the magnetrons equipped with the carburized REO co-doped Mo filament cathode at 1800° C. for 30 mins; and then the third assembly of magnetrons and doing the activation treatment of the REO co-doped Mo filament cathode at 1600° C. for 30 mins. Testing the direct current emission property of the electronic tube and the result was shown in Table 1. Then we tested the output power of the magnetron tube when the working temperature was 1250° C.

Example 5

Rare earth oxide was quantified in a weight fraction of 4 wt. % based on the rare earth oxide co-doped Mo powders, and the rest was Mo.

Dissolving 85.06 g of $La(NO_3)_3.6H_2O$, 18.86 g of $Lu(NO_3)_3.6H_2O$, 1766.6 g of $(NH_4)_6Mo_7O_{24}.4H_2O$ and 1870.5 g of $C_6H_8O_7.H_2O$ in de-ionized water respectively and completely, adding the citric acid, $La(NO_3)_3$ and $Lu(NO_3)_3$ solution into the $(NH_4)_6Mo_7O_{24}$ solution slowly with persistently agitation; setting the mixed solution in a water-bath heating environment to obtain a wet gel; drying the wet gel to obtain the xerogel; calcining the xerogel at 600° C. to obtain $La_2O_3$ and $Lu_2O_3$ co-doped $MoO_3$ powers; and calcining the mixed trioxide powders in hydrogen atmosphere at 600° C. to obtain $La_2O_3$, $Lu_2O_3$ doped $MoO_2$ powders thoroughly; calcining the mixed oxide powders further in hydrogen at 900° C. to obtain $La_2O_3$ and $Lu_2O_3$ doped Mo powders completely; pressing the mixed powers into REO co-doped Mo billet at 150 MPa and remained for 15 minutes; and sintering the REO co-doped Mo billets to obtain REO co-doped Mo rods at 1900° C. And rotary swaging the Mo rods for a few times to become the Mo sticks. Drawing the Mo sticks to decrease the diameter of the sticks to obtain the Mo filaments by multi drawing process. Cleaning the colloidal graphite on the surface of the Mo filament by electrolytic cleaning processes, and straightens the cleaned Mo filament. Winding Mo filament to a coil spring filament and annealing and modeling the Mo coil spring filament; cutting the molybdenum coil spring filament to small segments and each segment as a Mo filament cathode. First assembly of the filament cathodes and doing the carburization treatment of the REO co-doped Mo filament cathode at 1600° C. for 80 s and its carburization degree was 28.2%. Second assembly of the vacuum tubes and doing the out-gassing treatment of the magnetrons equipped with the carburized REO co-doped Mo filament cathode at 1800° C. for 30 mins; and then the third assembly of magnetrons and doing the activation treatment of the REO co-doped Mo filament cathode at 1600° C. for 30 mins. Testing the direct current emission property of the electronic tube and the result was shown in Table 1. Then we tested the output power of the magnetron tube when the working temperature was 1250° C.

Example 6

Rare earth oxide was quantified in a weight fraction of 4.5 wt. % based on the rare earth oxide co-doped Mo powders, and the rest was Mo.

Dissolving 95.69 g of $La(NO_3)_3.6H_2O$, 21.21 g of $Lu(NO_3)_3.6H_2O$, 1757.4 g of $(NH_4)_6Mo_7O_{24}.4H_2O$ and 1874.3 g of $C_6H_8O_7.H_2O$ in de-ionized water respectively and completely, adding the citric acid, $La(NO_3)_3$ and $Lu(NO_3)_3$ solution into the $(NH_4)_6Mo_7O_{24}$ solution slowly with persistently agitation; setting the mixed solution in a 80° C. environment to obtain a wet gel; drying the wet gel to obtain the xerogel; calcining the xerogel at 650° C. to obtain $La_2O_3$ and $Lu_2O_3$ co-doped $MoO_3$ powers; and calcining the mixed trioxide powders in hydrogen atmosphere at 600° C. to obtain $La_2O_3$, $Lu_2O_3$ doped $MoO_2$ powders thoroughly; calcining the mixed oxide powders further in hydrogen at 980° C. to obtain $La_2O_3$ and $Lu_2O_3$ doped Mo powders completely; pressing the mixed powers into REO co-doped Mo billet at 150 MPa and remained for 15 mins; and sintering the REO co-doped Mo billets to obtain REO co-doped Mo rods at 1950° C.; rotary swaging the Mo rods for a few times to become the Mo sticks. Drawing the Mo sticks to decrease the diameter of the sticks to obtain the Mo filaments by multi drawing process. Cleaning the colloidal graphite on the surface of the Mo filament by electrolytic cleaning processes, and straightens the cleaned Mo filament. Winding Mo filament to a coil spring filament and annealing and modeling the Mo coil spring filament; cutting the molybdenum coil spring filament to small segments and each segment as a Mo filament cathode. First assembly of the filament cathodes and doing the carburization treatment of the REO co-doped Mo filament cathode at 1600° C. for 80 s and its carburization degree was 27.3%. Second assembly of the vacuum tubes and doing the out-gassing treatment of the magnetrons equipped with the carburized REO co-doped Mo filament cathode at 1800° C. for 30 mins; and then the third assembly of magnetrons and doing the activation treatment of the REO co-doped Mo filament cathode at 1600° C. for 30 mins. Testing the direct current emission property of the electronic tube and the result was shown in Table 1. Then we tested the output power of the magnetron tube when the working temperature was 1250° C.

Example 7

Rare earth oxide was quantified in a weight fraction of 5 wt. % based on the rare earth oxide co-doped Mo powders, and the rest was Mo.

Dissolving 106.32 g of $La(NO_3)_3.6H_2O$, 23.58 g of $Lu(NO_3)_3.6H_2O$, 1748.2 g of $(NH_4)_6Mo_7O_{24}.4H_2O$ and 1878.1 g of $C_6H_8O_7.H_2O$ in de-ionized water respectively and completely, adding the citric acid, $La(NO_3)_3$ and $Lu(NO_3)_3$ solution into the $(NH_4)_6Mo_7O_{24}$ solution slowly with persistently agitation; setting the mixed solution in a 80° C. environment to obtain a wet gel; drying the wet gel to obtain the xerogel; calcining the xerogel at 680° C. to obtain $La_2O_3$ and $Lu_2O_3$ co-doped $MoO_3$ powers; and calcining the mixed trioxide powders in hydrogen atmosphere at 650° C. to obtain $La_2O_3$, $Lu_2O_3$ doped $MoO_2$ powders thoroughly; calcining the mixed oxide powders further in hydrogen at 850° C. to obtain $La_2O_3$ and $Lu_2O_3$ doped Mo powders completely; pressing the mixed powers into REO co-doped Mo billet at 150 MPa and remained for 15 minutes; and sintering the REO co-doped Mo billets to obtain REO co-doped Mo rods at 2000° C.; rotary swaging the Mo rods for a few times to become the Mo sticks. Drawing the Mo sticks to decrease the diameter of the sticks to obtain the Mo filaments by multi drawing process. Cleaning the colloidal graphite on the surface of the Mo filament by electrolytic cleaning processes, and straightens the cleaned Mo filament. Winding Mo filament to a coil spring filament and annealing and modeling the Mo coil spring filament; cutting the molybdenum coil spring filament to small segments and each segment as a Mo filament cathode. First assembly of the filament cathodes and doing the carburization treatment of the REO co-doped Mo filament cathode at 1550° C. for 100 s and its carburization degree was 25.4%. Second assembly of the vacuum tubes and doing the out-gassing treatment of the magnetrons equipped with the carburized REO co-doped Mo filament cathode at 1800° C. for 30 mins; and then the third assembly of magnetrons and doing the activation treatment of the REO co-doped Mo filament cathode at 1600° C. for 30 mins. Test the direct current emission property of the electronic tube and the result was shown in Table 1. Then we tested the output power of the magnetron tube when the working temperature was 1250° C.

TABLE 1

Table of the date of the carburizing degree and emission current tested without magnetic field

| Sample | Emission Current (mA) |
|---|---|
| 1 | 637 |
| 2 | 640 |
| 3 | 632 |
| 4 | 633 |
| 5 | 651 |
| 6 | 637 |
| 7 | 636 |

What is claimed is:

1. A rare earth oxide doped molybdenum filament cathode material, comprising lanthanum oxide ($La_2O_3$), lutetium oxide ($Lu_2O_3$) and molybdenum (Mo), wherein the total concentration of $La_2O_3$ and $Lu_2O_3$ is 2.0-5.0 wt. % and the rest is Mo.

2. The rare earth oxide doped molybdenum filament cathode material of claim 1, wherein the total concentration of $La_2O_3$ and $Lu_2O_3$ ranges from 3 to 4.5 wt. %.

3. The rare earth oxide doped molybdenum filament cathode material of claim 1, wherein $La_2O_3$ and $Lu_2O_3$ have a weight ratio of (2-5):1.

4. The rare earth oxide doped molybdenum filament cathode material of claim 1, wherein $La_2O_3$ and $Lu_2O_3$ have a weight ratio of 4:1.

5. The rare earth oxide doped molybdenum filament cathode material of claim 1, consisting of lanthanum oxide ($La_2O_3$), lutetium oxide ($Lu_2O_3$) and molybdenum (Mo).

6. The rare earth oxide doped molybdenum filament cathode material of claim 1, wherein the concentration of lanthanum oxide ($La_2O_3$) is higher than that of lutetium oxide ($Lu_2O_3$).

7. The rare earth oxide doped molybdenum filament cathode material of claim 1, wherein $La_2O_3$, $Lu_2O_3$ and Mo are evenly mixed.

8. A filament cathode made from lanthanum oxide ($La_2O_3$) and lutetium oxide ($Lu_2O_3$) doped molybdenum (Mo) powders, wherein the lanthanum oxide ($La_2O_3$) and lutetium oxide ($Lu_2O_3$) doped molybdenum (Mo) powders comprise $La_2O_3$, $Lu_2O_3$ and Mo with the total concentration of $La_2O_3$ and $Lu_2O_3$ being 2.0-5.0 wt. % and the rest being Mo.

9. The filament cathode of claim 8, wherein the total concentration of $La_2O_3$ and $Lu_2O_3$ ranges from 3 to 4.5 wt. %.

10. The filament cathode of claim 8, wherein the concentration of $La_2O_3$ is higher than that of $Lu_2O_3$.

11. The filament cathode of claim 10, wherein $La_2O_3$ and $Lu_2O_3$ have a weight ratio of (2-5):1.

12. The filament cathode of claim 11, wherein $La_2O_3$ and $Lu_2O_3$ have a weight ratio of 4:1.

13. The filament cathode of claim 8, wherein the lanthanum oxide ($La_2O_3$) and lutetium oxide ($Lu_2O_3$) doped molybdenum (Mo) powders consist of $La_2O_3$, $Lu_2O_3$ and Mo.

14. The filament cathode of claim 8, wherein the filament cathode is carburized and has a working temperature in a magnetron ranges from 1200 to 1400° C.

15. The filament cathode of claim 8, wherein $La_2O_3$, $Lu_2O_3$ and Mo are evenly mixed in the lanthanum oxide ($La_2O_3$) and lutetium oxide ($Lu_2O_3$) doped molybdenum (Mo) powders.

* * * * *